Figures 2, 3:
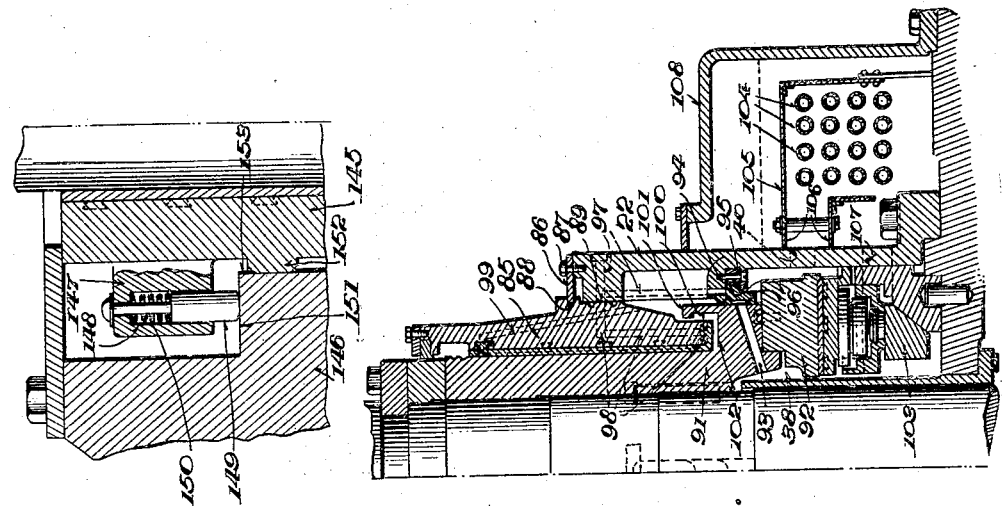

May 19, 1931.  H. A. S. HOWARTH  1,806,061

BEARING

Filed Dec. 21, 1928

Inventor

Harry A. S. Howarth.

By Cameron, Kerkam and Sutton.

Attorneys

Patented May 19, 1931

1,806,061

UNITED STATES PATENT OFFICE

HARRY A. S. HOWARTH, OF FRANKFORD, PENNSYLVANIA, ASSIGNOR TO KINGSBURY MACHINE WORKS, INC., OF FRANKFORD, PHILADELPHIA, PENNSYLVANIA, A CORPORATION OF DELAWARE

BEARING

Original application filed April 12, 1927, Serial No. 183,135. Divided and this application filed December 21, 1928. Serial No. 327,665.

This invention relates to bearings, and more particularly to steady bearings adapted to be associated with thrust bearings although certain features thereof are applicable to journal bearings generally.

This application is a division of application Serial No. 183,135, filed April 12, 1927, by the present applicant.

It has heretofore been the practice, in combined thrust and steady bearings, to support the steady bearing in one way or another from the pot or housing which surrounds the thrust bearing. This has necessitated that the mounting for the steady bearings be dependent upon the size and shape of said pot or housing, and inasmuch as the size and shape of the latter vary within wide limits depending upon the service to which the bearing is put, the character of the oil cooling employed, the size and speed of the bearings, etc., and as it is also common for the pot or housing to be furnished by a different manufacturer from that of the thrust bearing and the steady bearing, it has been impossible to standardize steady bearing supports with the thrust bearings with which they are associated.

It is an object of this invention to provide a steady bearing adapted to be associated with a thrust bearing wherein the support for the steady bearing is entirely independent of the size and shape of the pot or bearing housing, but is determined by the size of the thrust bearing, so that the steady bearing support may be standardized, and the steady bearing may be furnished with the thrust bearing as a unit by the bearing manufacturer.

Another object of this invention is to provide a novel steady bearing adapted to be associated with a thrust bearing as herein characterized, wherein the lubrication of the steady bearing is effected from the oil provided for lubricating the thrust bearing.

Another object of this invention is to provide a steady bearing with means for assuring a capillary film of oil between the bearing surfaces when the parts are stationary.

Another object of this invention is to provide a steady bearing adapted to be associated with a thrust bearing with novel means for enabling the steady bearing to be self-alining or with novel means for effecting the alinement of the steady bearing. Another object of this invention is the provision of a novel steady bearing comprising a shell which is elastically mounted for universal movement or for longitudinal movement. Another object of this invention is to provide a novel steady bearing support whereby the steady bearing may be self-alining.

Other objects will appear as the description of this invention proceeds.

The invention is capable of receiving a variety of mechanical expressions, several of which are shown on the accompanying drawing, but it is to be expressly understood that the drawing is for purposes of illustration only and is not to be construed as a definition of the limits of the invention, reference being had to the appended claims for that purpose. Referring to the drawings, wherein the same reference characters are employed to designate corresponding parts in the several figures, Fig. 1 is a half-axial section of a combined thrust and steady bearing embodying the present invention;

Fig. 2 is a half-axial section of another embodiment of the present invention; and Fig. 3 is a fragmentary section of another construction providing self-alinement of the steady bearing and embodying the present invention.

Figure 1:
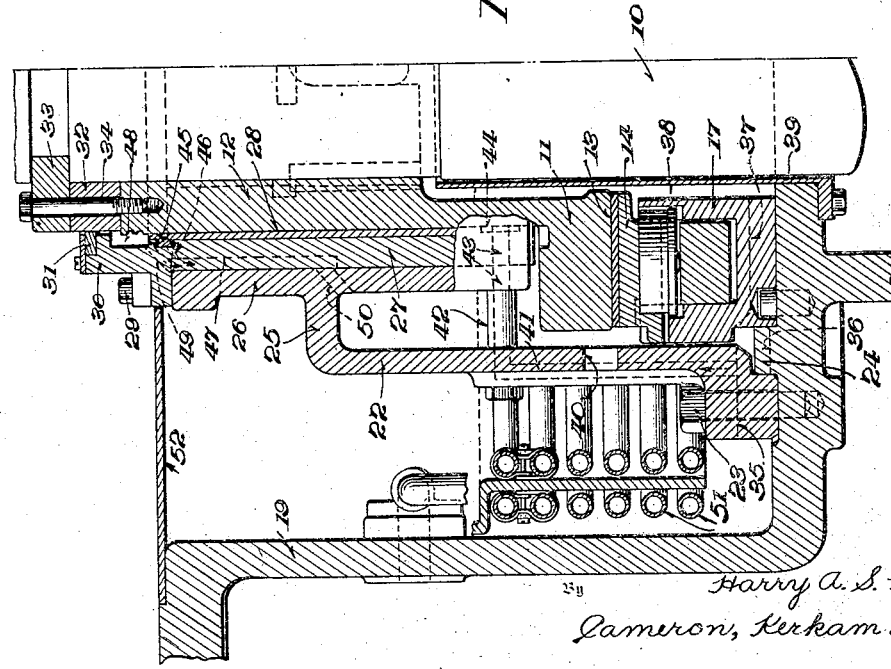

In the form shown in Fig. 1, shaft 10 has mounted thereon, and secured thereto in any suitable way, a thrust collar 11, provided integrally therewith or suitably attached thereto, with an elongated cylindrical extension 12 to constitute the rotatable member of the steady bearing. Cooperating with the bearing face 13 of the thrust collar 11 is the stationary member of a thrust bearing of any suitable construction, but preferably composed of a plurality of bearing segments or shoes 14 suitably mounted to tilt circumferentially of the axis of the bearing, to form wedge-shaped oil films between the bearing surfaces of said segments and the collar, and also preferably to tilt radially of the axis of the bearing, to maintain proper bearing engagement throughout the radial width of said bearing surfaces. Any other suitable form of support or mounting for the stationary bearing member or its elements may be provided, the details of the thrust bearing per se forming no part of the present invention.

In conformity with the present invention the steady bearing associated with the cylindrical extension 12 of the thrust collar 11 is mounted in unitary relationship with the thrust bearing elements and the support for the steady bearing elements is rendered independent of the size and shape of the pot 19, being preferably determined by the size of the thrust bearing, as shown. In the form illustrated in Fig. 1, a generally cylindrical casing 22, which may be continuous or more or less interrupted in a circumferential direction, is mounted on the base or bottom of the pot 19 in any suitable way, being shown as attached thereto by bolts or screws 23. Said casing 22 is preferably centered with respect to the shaft, and to this end the bottom of the pot 19 is shown as provided with a circumferential rib 24, integral therewith or suitably attached thereto, to cooperate with the inside periphery of the inner extremity of the casing 22.

At its opposite extremity the casing 22 is provided with an angularly and inwardly directed portion 25, shown as extending at substantially a right angle to the axis of the casing 22, although this is not essential, said portion 25 being connected to or integrally formed with, a cylindrical sleeve-like support 26 which carries the shell 27 of the steady bearing whose Babbitt facing is indicated at 28. Said shell 27 may be secured to the support 26 in any suitable way, as by bolts or screws 29, and is shown as having an axial extension 30 which carries an oil-retaining ring 31 of felt although it might be a floating metal ring. An adjusting ring 32 is shown as interposed between the extremities of the thrust block 11, 12 and a retaining ring key 33 carried in a groove in the shaft 10, so that by varying the thickness of the ring 32 or by the interposition of shims, the shaft may be adjusted in the direction of its axis with respect to the plane of the thrust surface 13, screws 34 being shown as passed through the rings 33 and 32 and threaded into the extremity of the thrust block 11, 12.

In order that the steady bearing shall be self-alining with respect to the shaft, the inwardly and angularly directed portion 25 of the casing 22 is made of such dimensions as to possess the requisite elasticity to enable the support 26, and the stationary bearing member carried thereby, to properly aline themselves with the axis of the shaft. The elasticity of the portion or neck 25 therefore renders the steady bearing self-alining, and when this feature is employed, the bearing members of the steady bearing are preferably provided with oil grooves such as to maintain the desired balance between the various portions of the oil film with respect to the radial plane of said elastic support 25, as explained in my copending application, Serial No. 327,664, filed December 21, 1928.

The steady bearing is preferably provided with oil from the body of oil normally maintained in and circulating through the pot or oil well 19 for the lubrication of the thrust bearings. The oil circulation through the parts of the thrust bearing is maintained in any suitable way. In the form shown, the base of the casing 22, the circumferential ring 24 and the base of the channel-shaped ring 17, are provided with suitably alined slots or apertures 35, 36 and 37, respectively, so that oil may flow radially inward adjacent the bottom of the pot from the surrounding body of oil in the pot to the axially directed channel 38 between the inner periphery of the stationary thrust bearing members and the stationary oil-retaining tube 39 suitably secured to the pot within the aperture thereof. The oil flowing axially through the passage 38 flows radially outward through oil grooves or between the bearing segments 14, to form the oil films between the thrust bearing surfaces, returning to the body of oil in the pot or oil well through apertures 40 provided in the casing 22.

The oil for lubricating the steady bearing is preferably derived from this circulating oil and to this end the casing 22 is shown as provided with suitable channels and oil pumping means to effect a circulation of oil from the oil in the oil well to the bearing surfaces of the steady bearing. As shown the casing 22 is provided with one or more axially directed passages 41 each of which opens at one end into one of the slots or apertures 35 and at its opposite end communicates through pipes 42, interposed between the casing 22 and the support 26, with alined passages 43 in the support 26 and shell 27, which passages lead to one or more suitable grooves 44 in the babbitt 28 constituting a viscosity pump. It is to be expressly understood, however, that any other suitable form of pump may be employed in this and other embodiments of this invention.

The babbitt 28 is provided with oil grooves of any suitable character, whereby the oil pumped upwardly by the viscosity pump 44 is supplied to the bearing surfaces of the steady bearing, and at its upper extremity the babbitt 28 contains an oil collecting and air sealing groove 45 which communicates through one or more suitable outlet apertures 46 with one or more return passages 47 in the shell 27. The upper extremity of the shell 27 is also preferably provided with an oil collecting chamber 48 which communicates through one or more passages 49 with the return passages 47. The return passage 47 communicates with a passage 50 through the support 26 whereby the oil is returned to the oil well within the chamber between the casing 22 and the support 26. The quantity of oil circulated to and through the steady bearing is controlled by the number, size, shape and arrangement of the passages, as well understood in the art.

In the form shown, a cooling coil 51 is mounted within the pot to effect the proper cooling of the oil as it returns from the thrust bearing and the steady bearing surfaces before it is again drawn into the passages 35, 36, and 37. In the structure illustrated, the cooling coil is supported by the pot 19, but it could with equal facility be supported by the casing 22 if desired. The top of the pot or oil well is shown as closed by a cover plate 52 of any suitable type and attached to the pot in any suitable way.

In the form shown in Fig. 2, the support for the steady bearing again takes the form of a generally cylindrical casing 22, but in this construction the sleeve 85 which constitutes the shell for the steady bearing is vertically supported from the extremity of the casing 22 by an elastic ring 86 suitably attached to the casing 22, as by screws 87, and suitably attached to the shell 85 as by engagement in a groove 88 therein. The shell 85 is centered in the aperture in the upper end of the casing 22, but has sufficient clearance and endwise play with respect thereto to enable the shell 85 to aline itself with the axis of the shaft by flexure of the ring 86. The surfaces 89 between the shell 85 and the casing 22 may be made generally cylindrical as illustrated, or they may be made spherical, or one may be cylindrical and the other spherical to increase the freedom of movement. Furthermore, the flexible ring 85 may, if desired, be used as the sole support of the shell 85. In this form, the thrust block 91 is made separate from and suitably attached to the runner 92, and is provided with one or more passages 93 which lead from the channel 38 at the inner periphery thereof. A radially adjustable ring 94, carried by a stationary ring 95 supported from the casing 22, and having passages 96 therein, is adapted to receive the oil from the passages 93 and deliver it to passages 97 suitably formed in casing 22 and leading to passages 98 formed in the shell 85, by which the oil is delivered to the steady bearing surfaces. The inner ends of the passages 93 take oil from the passage 38 and by centrifugal action deliver the oil under pressure to the ring 94, from which it flows through the passages 97 and 98 to the steady bearing surfaces, and return passages one being indicated at 99, communicating with passages (not shown) that lead out into the reservoir through casing 22 below the upper horizontal wall of the reservoir.

In this embodiment the thrust block 91 is provided with a channel 100 which embraces the lower extremity of the steady bearing shell 85, and the outer extremity of said shell is provided with an overhanging flange 101. When the thrust block is rotated and the oil is being supplied to the steady bearing surfaces through the passages 97 and 98, some of the oil will collect in the channel 100 and be thrown by centrifugal action against the outer wall of said channel, the overhanging flange 101 preventing the escape from this channel of a certain amount of the oil and thus providing an auxiliary oil reservoir within the rotating thrust block above the oil level in the main reservoir. When the shaft is at rest, the oil in the channel 100 collects in the bottom of said channel, and seals the lower end of the bearing clearances at 102 between the bearing surfaces of the steady bearing. Hence oil will rise between said bearing surfaces by capillary action and thereby maintain oil between said bearing surfaces when the parts are at rest and facilitate the starting of the bearing.

In the form shown in Fig. 2 the stationary thrust bearing member is mounted on a ball and socket equalizing ring 103. The cooling coil 104 is provided with a housing 105 to direct the circulating oil into intimate contact therewith, and the inlet to said housing, which communicates with the apertures 40 in the casing 22, is shown as formed by spaced baffles 106 which may cooperate with the periphery of the casing 22 to center the housing 105. One or more passages for the flow of oil from the oil well to the inner side of the thrust bearing members are indicated at 107. The bearing housing 108 is thus entirely independent of the cooling coil and its housing as well as the parts of the thrust and steady bearings and the support for the elements thereof.

Fig. 3 shows another manner of supporting the steady bearing shell 145 from its supporting sleeve 146. As here shown the shell 145 is provided with a plurality of lugs 147 each of which is provided with a cylindrical recess 148 within which works a plunger 149. A coil spring 150 is interposed between said plunger and the bottom of said recess so that said plunger is normally urged outwardly into engagement with a surface or shoulder 151 on the support 146. Shell 145 also carries a peripheral rib or flange 152 having its peripheral surface curved or otherwise suitably shaped to cooperate with suitable clearance with the inner surface 153 of the aperture through the support 146. The shell 145 is thus elastically supported axially on the support 146 through the intermediary of the spring-pressed plungers 149, and said shell is self-alining, the surface of engagement between the rib or flange 152 and the inner wall 153 of the aperture in the support 146 affording freedom for such movement of said shell as is necessary for it to aline itself with the axis of the shell. The springs 150 are selected of such size that they suitably support the weight of the shell 145 without becoming solid.

It will be seen that there is here provided a steady bearing adapted to be associated with a thrust bearing wherein the support for the steady bearing is entirely independent of the size and shape of the pot or bearing housing, but may be determined by the size of the thrust bearing, so that the support for the steady bearing may be standardized and the steady bearing and thrust bearing may be furnished as a unit. Moreover, the steady bearing may be made self-alining and lubricated by oil supplied from the thrust bearing as desired, and the steady bearing may be made self-alining in various ways, while the lubrication of the steady bearing may be effected in various ways and by means variously disposed with respect to the bearing elements.

While certain embodiments of the invention have been shown and described in detail, it is to be expressly understood that the illustrated embodiments are not exclusive, and various other embodiments will now suggest themselves to those skilled in the art, while changes may be made in the details of construction, arrangement and proportion of parts, and certain features used without other features, without departing from the spirit of this invention. Reference is therefore to be had to the claims hereto appended for a definition of the limits of the invention.

What is claimed is:

1. In a bearing, the combination with a vertical rotatable shaft, an oil reservoir surrounding the shaft, a nonrotatable bearing member for the shaft, and a self-alining support for said bearing member mounted on the base of said reservoir.

2. In a bearing, the combination with a vertical rotatable shaft, an oil reservoir surrounding the shaft, a nonrotatable bearing member for the shaft, and a self-alining support for said bearing member mounted on the base of said reservoir and spaced inwardly from the wall of the reservoir.

3. In a bearing, the combination with a vertical rotatable shaft, an oil reservoir surrounding the shaft, a nonrotatable bearing member for the shaft, and a self-alining support for said bearing member mounted on the base of said reservoir and spaced inwardly from the wall of the reservoir, said support being independent of the size and shape of said reservoir.

4. In a bearing, the combination with a vertical rotatable shaft, an oil reservoir surrounding the shaft, a nonrotatable bearing member for the shaft, and an elastic support for said bearing member mounted on the base of said reservoir and permitting self-alinement of the bearing member.

5. In a bearing, the combination with a vertical rotatable shaft, an oil reservoir surrounding the shaft, a nonrotatable bearing member for the shaft, a self-alining support for the bearing member mounted on the base of the reservoir and means for supplying oil through said support to said bearing member.

6. In a bearing, the combination with a vertical rotatable shaft, an oil reservoir surrounding the shaft, a nonrotatable bearing member for the shaft, a self-alining support for the bearing member mounted on the base of the reservoir, means for supplying oil through said support to said bearing member, and means for maintaining an oil seal at one end of the bearing member.

7. In a steady bearing for a vertical shaft, the combination of an oil reservoir surrounding said shaft, a nonrotatable steady bearing member for the shaft, resilient means for supporting the bearing member above the reservoir so as to permit self-alinement of the bearing member, means for supplying lubricant from said reservoir to the bearing member, and means for maintaining a lubricant seal around the lower end of the bearing member.

8. In a steady bearing for a vertical shaft, the combination of an oil reservoir surrounding said shaft, a nonrotatable steady bearing member for the shaft, and means forming a resilient universal support for the bearing member above the reservoir, said means being mounted on the base of the reservoir.

9. In a steady bearing for a vertical shaft, the combination with an oil reservoir surrounding said shaft, a nonrotatable steady bearing member for the shaft, means mounted on the base of the reservoir forming a resilient universal support for the bearing member above the reservoir, and means for raising a supply of lubricant from the reservoir to the bearing member.

10. In a steady bearing for a vertical shaft, the combination of an oil reservoir surrounding said shaft, relatively rotatable steady bearing members for the shaft, means forming a resilient support for the stationary bearing member above the reservoir, said means being mounted on the base of the reservoir, and means including a lubricant pump for raising lubricant from said reservoir to the bearing surfaces.

11. In a steady bearing for a vertical shaft, the combination of an oil reservoir surrounding said shaft, a nonrotatable steady bearing member for the shaft, means forming a resilient universal support for the bearing member above the reservoir, said means being mounted on the base of the reservoir, means for raising a supply of lubricant from the reservoir to the bearing member, and means to retain a lubricant seal around the lower end of the bearing member.

12. In a vertical steady bearing, rotatable and stationary bearing members and means to supply lubricant to the bearing surfaces thereof, said rotatable bearing member being formed at its lower end to provide a lubricant reservoir.

13. In a vertical steady bearing, rotatable and stationary bearing members and means to supply lubricant to the bearing surfaces thereof, said rotatable bearing member being formed at its lower end to provide a lubricant reservoir surrounding the lower end of the stationary bearing member.

14. In a vertical steady bearing, rotatable and stationary bearing members, said rotatable member having means for pumping lubricant to the bearing surfaces and being formed at its lower end to provide an air seal for said bearing members.

15. In a vertical steady bearing, rotatable and stationary bearing members, said rotatable bearing member having means for pumping lubricant to the bearing surfaces and being formed at its lower end to provide a lubricant reservoir.

16. In a vertical steady bearing, rotatable and stationary bearing members, said rotatable bearing member having means for pumping lubricant to the bearing surfaces and being formed at its lower end to provide a lubricant reservoir surrounding the lower end of the stationary bearing member.

17. In a vertical steady bearing, a lubricant reservoir, rotatable and stationary bearing members located above the reservoir, and means for raising lubricant from said reservoir to the bearing surfaces, said rotatable bearing member being formed to provide an auxiliary lubricant reservoir.

18. In a vertical steady bearing, a lubricant reservoir, rotatable and stationary bearing members located above the level of lubricant in said reservoir, and means for raising lubricant from said reservoir to the bearing surfaces, said rotatable bearing member being formed at its lower end to provide an auxiliary lubricant reservoir which will also act as an air seal.

19. In a vertical steady bearing, a lubricant reservoir, rotatable and stationary bearing members located above the level of lubricant in said reservoir, and means for raising lubricant from said reservoir to the bearing surfaces, said rotatable bearing member being formed at its lower end to provide an auxiliary lubricant reservoir surrounding the lower end of the stationary bearing member.

20. In a vertical steady bearing, rotatable and nonrotatable bearing members, elastic supporting means for the nonrotatable bearing member, and means on the rotatable bearing member adapted in operation to force lubricant through the supporting means and the nonrotatable member to the bearing surfaces.

21. A vertical steady bearing comprising stationary and rotatable bearing members, said stationary bearing member having a curved supporting surface, a supporting member therefor having a cooperating curved surface, elastic positioning means connecting the stationary member and support, and means carried by the rotatable member for forcing lubricant through the supporting member, the cooperating curved surfaces, and the stationary member to the bearing surfaces.

22. A vertical steady bearing comprising stationary and rotatable bearing members, said stationary bearing member having a curved supporting surface, a supporting member therefor having a cooperating curved surface, elastic positioning means connecting the stationary member and support, said rotatable member being arranged to dip into a pool of lubricant at its lower end, and having radial passages at said end adapted to throw lubricant outwardly, and means on said support cooperating with said passages to convey the lubricant through said supporting member and stationary bearing member to the bearing surfaces.

23. A vertical steady bearing comprising stationary and rotatable bearing members, said stationary bearing member having a curved supporting surface, a supporting member therefor having a cooperating curved surface, elastic positioning means connecting the stationary member and support, said rotatable member being arranged to dip into a pool of lubricant at its lower end, and having radial passages at said end adapted to throw lubricant outwardly, means on said support cooperating with said passages to convey the lubricant through said supporting member and stationary bearing member to the bearing surfaces, and means to retain a lubricant seal around the lower ends of the bearing surfaces.

24. A vertical steady bearing comprising stationary and rotatable bearing members, said rotary member being formed at its lower end to provide a centrifugal oil pump, a self-alining support for the stationary member having means cooperating with the oil pump to convey oil to the stationary member, and said stationary member having means to convey the oil to the bearing surfaces and return it to the zone of the pump.

25. A vertical steady bearing comprising stationary and rotatable bearing members, said rotary member being formed at its lower end to provide a centrifugal oil pump and an oil seal, a self-alining support for the stationary member having means cooperating with the oil pump to convey oil to the stationary member, and said stationary member having means to convey the oil to the bearing surfaces and return it to the zone of the pump.

26. In a steady bearing for a vertical shaft, the combination of an oil reservoir surrounding said shaft, a cylindrical stationary steady bearing member, a cylindrical support for said stationary bearing member mounted on the base of said reservoir, and an elastic connection between said bearing member and support.

27. In a steady bearing for a vertical shaft, the combination of an oil reservoir surrounding said shaft, a cylindrical stationary steady bearing member, a cylindrical support for said stationary bearing member mounted on the base of said reservoir, said support having an elastic neck portion connecting said support to said bearing member.

28. In a steady bearing for a shaft, rotary and stationary steady bearing members, a casing surrounding the stationary bearing member and forming a radial bearing therefor, and elastic means affording universal motion between the stationary bearing member and casing and constituting the sole means for opposing relative longitudinal movement therebetween.

29. In a steady bearing for a shaft, rotary and stationary steady bearing members, a casing surrounding the stationary bearing member and provided with an inwardly extending annular portion having a rocking bearing engagement therewith, and elastic means affording universal motion between the casing and stationary bearing member and constituting the sole means for opposing relative longitudinal movement therebetween.

30. In a steady bearing for a shaft, a stationary steady bearing member, a casing surrounding the stationary bearing member and forming a radial bearing therefor, and a resilient ring mounted on one of said members and engaged with the other, constituting the sole means for opposing relative longitudinal movement therebetween.

In testimony whereof I have signed this specification.

HARRY A. S. HOWARTH.